3,158,654
PREPARATION OF LIQUID REACTION PRODUCTS OF DECABORANE AND MONOOLEFIN HYDROCARBONS
John W. Ager, Jr., Buffalo, N.Y., assignor to Olin Mathieson Chemical Corporation, a corporation of Virginia
No Drawing. Filed Jan. 15, 1959, Ser. No. 787,089
3 Claims. (Cl. 260—606.5)

This invention relates to the preparation of liquid reaction products of decaborane and normally gaseous monoolefin hydrocarbons.

The liquid products of this invention can be employed as aircraft gas turbine fuels to be burned with air either alone or in admixture with hydrocarbons presently being used, such as JP–4, as described in patent application Serial No. 514,121 of Hugo Stange et al. filed June 8, 1955.

The liquid reaction products of this invention can be prepared by the reaction of a normally gaseous monoolefin hydrocarbon, such as ethylene, propylene or butylene, with decaborane in the presence of a compound of the class $B_{10}H_{13}M$ wherein M is an alkali metal, such as lithium, sodium or potassium, for example, decaboranyl sodium, $NaB_{10}H_{13}$.

Decaborane is a white crystalline solid having a melting point of 99.5° C. and a boiling point of 213° C. It can be prepared by the pyrolysis of diborane according to procedures well known in the art. Decaboranyl sodium can be prepared, for example, by the direct reaction of decaborane and sodium hydride an diethylether. Decaboranyl sodium and other compounds of the class $B_{10}H_{13}M$ can be prepared by the reaction of the appropriate alkali metal hydride with decaborane in the presence of an alkyl halide as described in copending application Serial No. 787,088, filed January 15, 1959, of Heying and issued as U.S. Patent No. 3,066,009 on November 27, 1962.

The ratio of reactants can be varied widely, generally being in the range of from 0.1 to 20 moles of olefin hydrocarbon per mole of decaborane and preferably in the range of from 1 to 10 moles of olefin hydrocarbon per mole of decaborane. The amount of decaboranyl alkali metal compound employed also can be varied widely, generally being in the range of from 0.01 to 10 moles of decaboranyl alkali metal compound per mole of decaborane and preferably in the range of 0.1 to 1 mole of decaboranyl alkali metal compound per mole of decaborane. The reaction temperature can vary from 170° C. to 350° C., little reaction taking place below 170° C. The pressure can vary from 40 to 400 p.s.i.g. and conveniently from 100 to 300 p.s.i.g. This represents a considerable improvement over prior processes carried out in the absence of the decaboranyl alkali metal compound which require pressures substantially higher than those employed in the present invention. The reaction generally requires about 1 to 5 hours, depending upon the ratio of reactants and the temperature and pressure employed.

The process of this invention is illustrated in detail by the following experiments which are to be considered not limitative.

Example I

Decaboranyl sodium, $NaB_{10}H_{13}$, was prepared from 1 gram of decaborane and excess sodium hydride (about 0.5 g.) in 50 ml. of diethyl ether at room temperature. After a few minutes, when the reaction had subsided, the solution was filtered to remove unreacted sodium hydride and the ether was distilled from the filtrate. The product was a yellow paste which solidified to a little yellow solid when it was stirred in refluxing pentane. The pentane then was distilled off leaving a dry light yellow solid which was decaboranyl sodium.

About 1.1 grams of this solid was placed in a 300 ml. rocking autoclave with 10 grams of decaborane. The autoclave was flushed with nitrogen, pressured to 200 p.s.i.g. with ethylene, and then heated at 193° C. with agitation. The maximum pressure was 260 p.s.i.g. and after 3 hours the total pressure drop was 80 p.s.i.g. The contents of the autoclave were washed out with benzene, filtered, and the benzene distilled off. The remaining thick dark brown oily residue was distilled and about 0.2 ml. of material was obtained at 57° C. and 1 mm. of mercury pressure absolute, along with some decaborane. Mass spectrometric analysis of the distillate indicated that it consisted mainly of monoethyldecaborane with some diethyldecaborane and triethyldecaborane. The distillation residue was about 8 grams of a dark viscous material containing 62 percent boron.

Example II

The previous experiment was repeated except that the temperature of the autoclave was raised slowly, over a period of three hours to 175° C. The maximum pressure was 255 p.s.i.g. and at 175° C. the pressure started to fall. The temperature was then reduced. Below 170° C., there was no pressure decrease. The autoclave was then held at 170° C. for about 3 hours. The total pressure drop was 80 p.s.i.g. The products were handled in the same way as in the previous experiment. This time, there was considerably more unreacted decaborane and the viscous residue after sublimation of the decaborane contained 58 percent boron.

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuels presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600° to 1650° F. Operation at these peak temperatures is limited to periods of approximately five minutes at take-off and climb and approximately 15 minutes at combat conditions in the case of military aircraft. By not permitting operation at higher temperatures, and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and in afterburning and other auxiliary burning schemes for the turbojet and by-pass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operations with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

We claim:

1. A method for the preparation of liquid reaction products of decaborane and a normally gaseous monoolefin hydrocarbon which comprises reacting decaborane and normally gaseous monoolefin hydrocarbon while the reactants are in admixture with a compound of the class $B_{10}H_{13}M$ wherein M is an alkali metal at a pressure within the range of 40 to 400 p.s.i.g. and a temperature within the range of 170° to 350° C.

2. A method for the preparation of liquid reaction products of decaborane and a normally gaseous monoolefin hydrocarbon which comprises reacting from 0.1 to 20 moles of monoolefin hydrocarbon per mole of decaborane while the reactants are in admixture with 0.01 to 1 mole per mole of decaborane of a compound of the class $B_{10}H_{13}M$ wherein M is an alkali metal per mole of decaborane at a pressure within the range of 40 to 400 p.s.i.g. and a temperature within the range of 170° to 350° C.

3. The method of claim 2 wherein the monoolefin hydrocarbon is ethylene and the compound of the class $B_{10}H_{13}M$ is decaboranyl sodium, $NaB_{10}H_{13}$.

No references cited.